July 5, 1949.  O. B. SHAFER  2,475,340
MECHANISM FOR CHECKING CONCURRENTLY OPERATING
ACCUMULATING AND PRINTING DEVICES
Filed Dec. 13, 1947  6 Sheets-Sheet 1
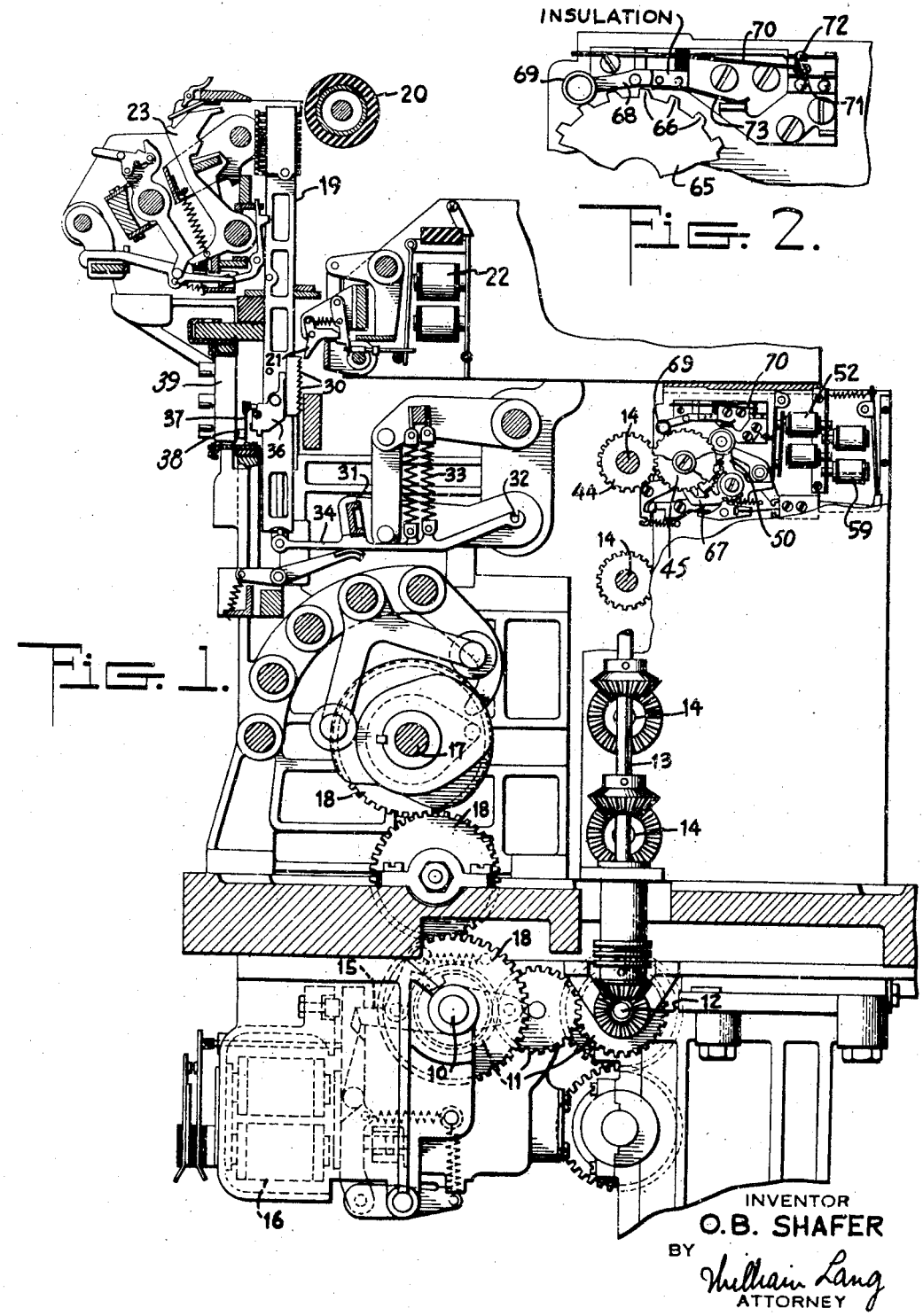
INVENTOR
O. B. SHAFER
BY
William Lang
ATTORNEY

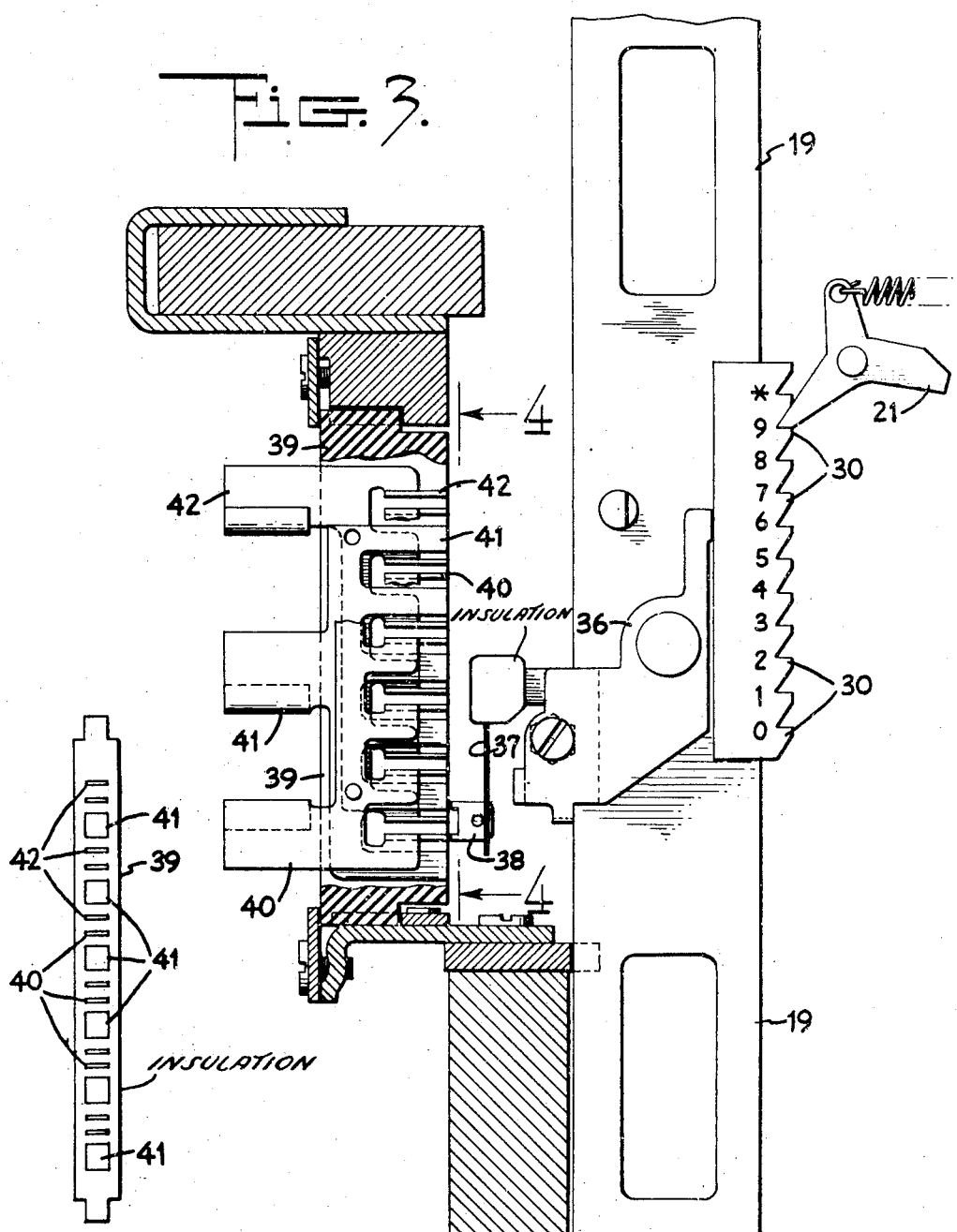

July 5, 1949.  O. B. SHAFER  2,475,340
MECHANISM FOR CHECKING CONCURRENTLY OPERATING
ACCUMULATING AND PRINTING DEVICES
Filed Dec. 13, 1947  6 Sheets-Sheet 3
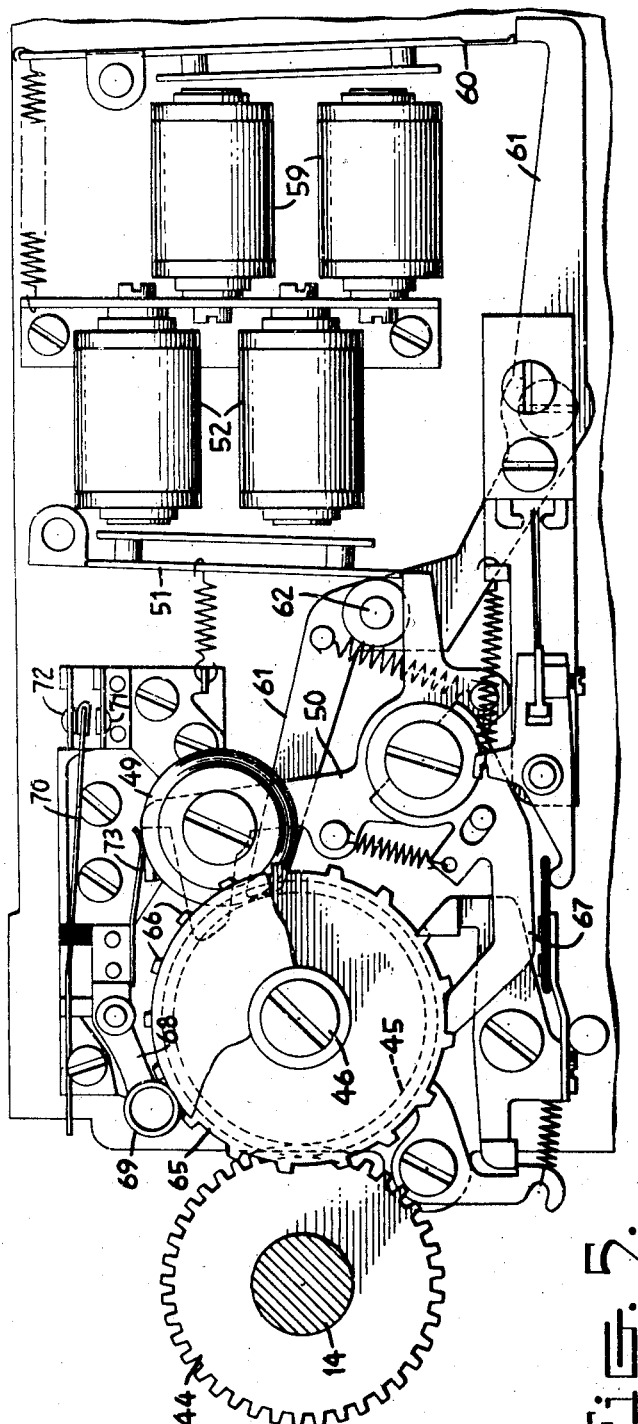
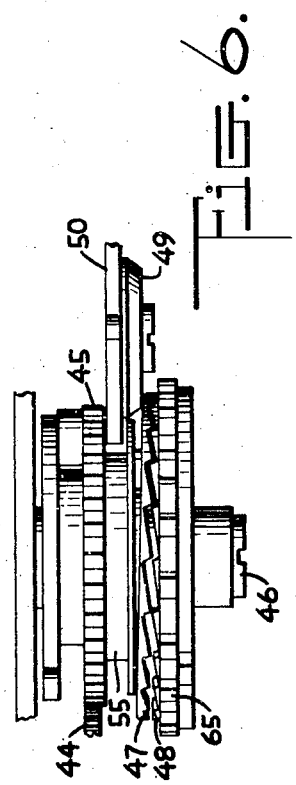
INVENTOR
O. B. SHAFER
BY
William Lang
ATTORNEY

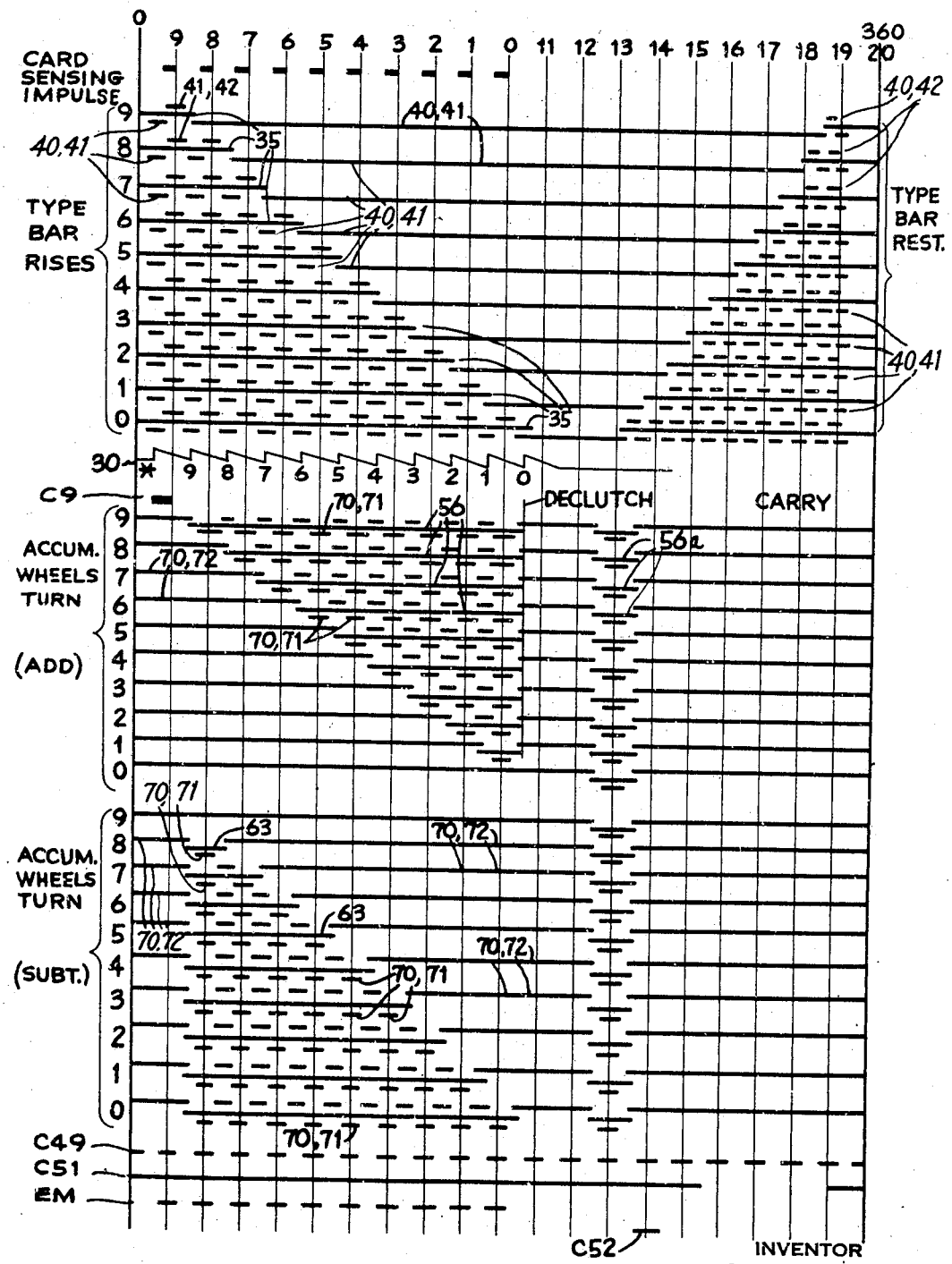

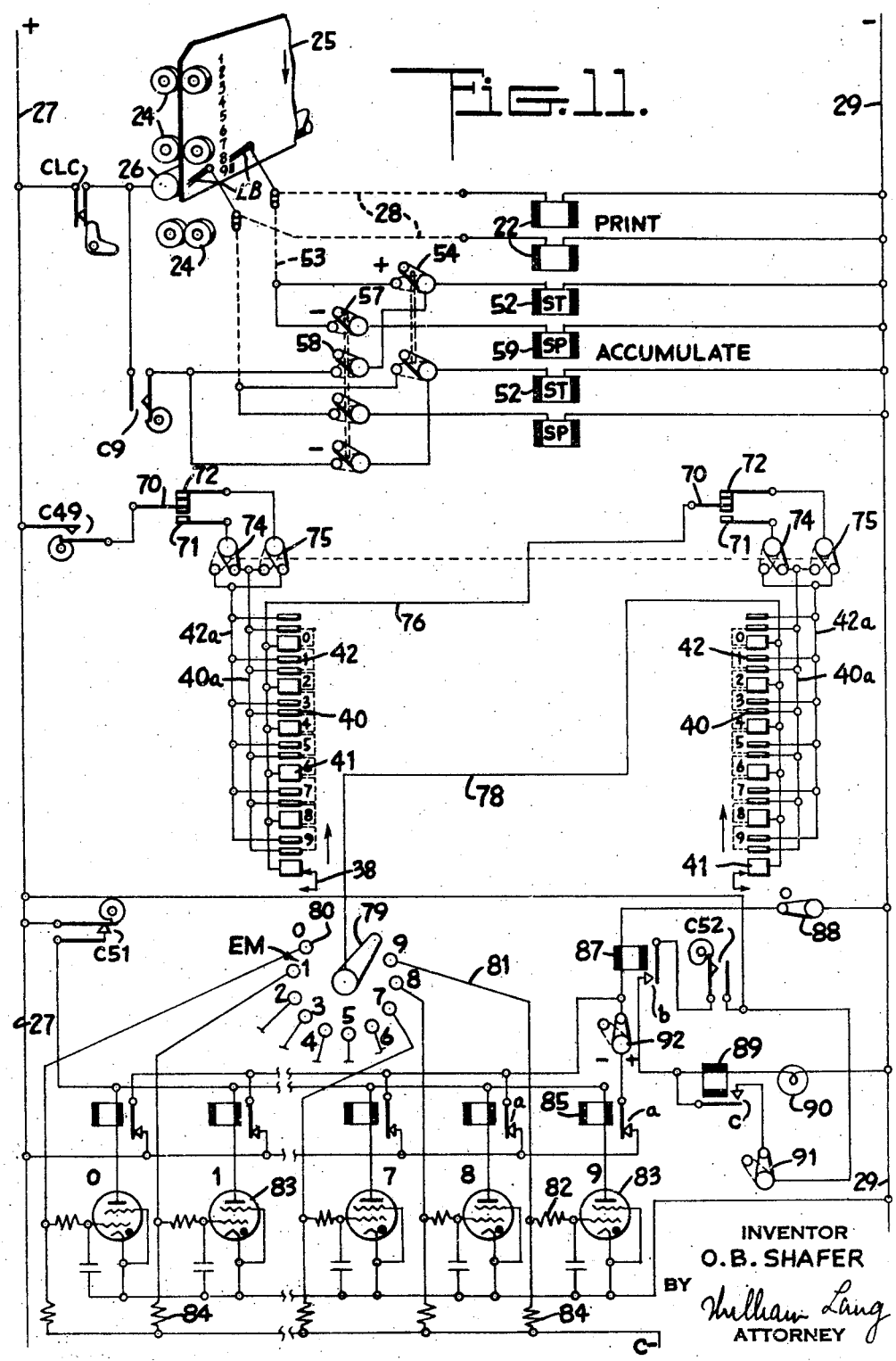

Patented July 5, 1949

2,475,340

UNITED STATES PATENT OFFICE 2,475,340

MECHANISM FOR CHECKING CONCURRENTLY OPERATING ACCUMULATING AND PRINTING DEVICES

Orville B. Shafer, Owego, N. Y., assignor to International Business Machines Corporation, New York, N. Y., a corporation of New York Application December 13, 1947, Serial No. 791,480

4 Claims. (Cl. 235—61.7)

1

The present invention relates to record controlled accounting machines and more particularly to verifying or checking devices embodied therein.

The principal object of the invention is to provide an improved checking mechanism for checking the operation of a pair of separately driven differential devices in the machine for the purpose of verifying that they maintain a predetermined relative synchronization.

A more specific object of the invention is to provide an improved checking mechanism controlled in part by a printing device and in part by an accumulating device to insure that the differential positioning of the one device for a given value corresponds to the differential positioning of the other for the same value.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a central section of a well known type of accounting machine showing the relative location of the printing and accumulating devices with which the invention is concerned, and their operating instrumentalities.

Fig. 2 is a detail view of a contact device associated with the accumulator for carrying out the objects of the invention.

Fig. 3 is an enlarged view of a contact device associated with the type bar for carrying out the objects of the invention.

Fig. 4 is a detail view looking in the direction of lines 4—4 of Fig. 3.

Fig. 5 is a detail view of a denominational order of the accumulator showing the application of checking contacts thereto.

Fig. 6 is a detail of the accumulating unit clutch mechanism.

Fig. 7 is a time chart showing the relative periods of movement of the type bar and accumulator for one cycle of operation.

Fig. 11 is a simplified wiring diagram of the apparatus.

Figure 8:
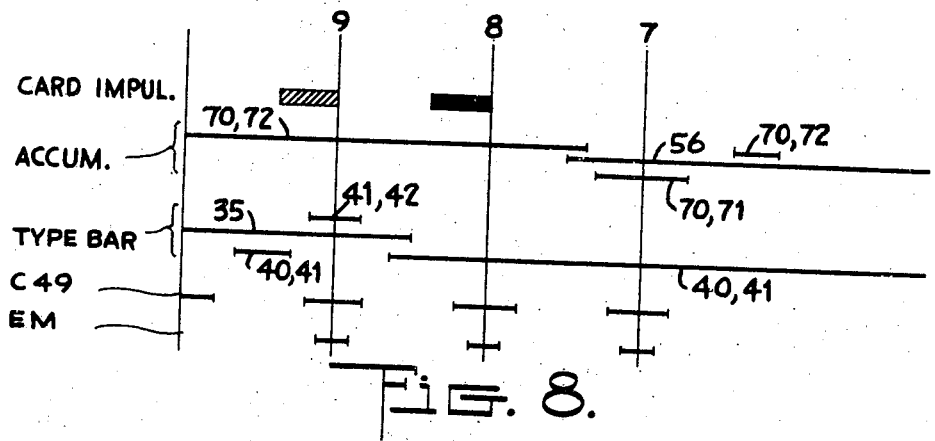
Figs. 8, 9 and 10 are enlarged parts of the time chart to illustrate specific checking conditions.

The type of accounting machine to which the invention is applied is shown generally in Fig. 1 and is similar to the machine shown in Patents 1,909,549 and 1,914,285 granted on May 16, 1933, and June 13, 1933, respectively, with the improved

2 form of accumulating mechanism disclosed in Patent 2,165,288, granted on July 11, 1939.

A brief description will first be given of the construction and operation of such a machine and thereafter it will be explained how the devices of the invention have been incorporated therein.

The printing mechanism

Referring to Fig. 1, the main drive shaft 10 is suitably driven from a motor (not shown) and through gearing 11 drives shaft 12 which has bevel gear connection with a vertical shaft 13. This shaft in turn has bevel gear connections with horizontal shafts 14 which make one revolution per cycle of the machine. A clutch mechanism generally designated 15 controlled by a clutch magnet 16 causes connection of shaft 17 to the main shaft 10 through the gearing designated 18. This shaft 17 carries the cams which operate the printing section of the machine in which type bars 19 are reciprocated past a platen 20 and may be interrupted at differential times during an upward movement by stop pawls 21 tripped under control of print magnets 22. After all the type bars have been positioned, printing hammers 23 are tripped to take an impression.

The machine is provided with the usual card feeding mechanism, which is diagrammatically represented in Fig. 11 and includes feed rollers 24 driven in unison with the printing devices to move a record card 25 past a row of sensing brushes LB and cooperating contact roller 26. The record card is provided with the usual columns of perforation receiving index positions in each of which a digit may be represented by a perforation in the correspondingly numbered position.

When a hole is encountered by brush LB, a circuit is completed from left side of line 27, through usual card lever contacts CLC (closed only while a card traverses brushes LB), contact roller 26, hole in the card, brush LB, connection 28 and print magnet 22 to right side of line 29. Magnet 22 when thus energized will trip related stop pawl 21 (Figs. 1 and 3) to engage a tooth 30 on type bar 19 which will stop the bar in position to print the digit corresponding to the hole sensed. Thus, as illustrated in Fig. 3, the tripping of pawl 21 has engaged the 9 tooth 30 to position bar 19 to print a 9.

It will be noted from Fig. 1 that the type bar actuating mechanism comprises a restoring bail 31 pivoted at 32, which is rocked clockwise and as it does so spring 33 will rock a lever 34 also pivoted at 32 so that the type bar which is connected to the left end of lever 34 will be raised by the spring action. Thus, when a tooth 30 is intercepted by pawl 21, the actuating spring 33 will yield while bail 31 continues its movement.

In the time chart (Fig. 7), there is represented the relative timing of the parts necessary for an understanding of the present invention. The periods during which the card perforations are sensed are indicated along the upper line labeled "Card sensing impulse." The horizontal lines 35 represent the extent of movement of a type bar which is represented separately for each of the digits. Thus, it is noted that at the beginning of the cycle the type bar begins to rise and, if for example a 9 hole is sensed, the movement of the type bar is interrupted between the 9 and 8 times in the cycle denoting a so-called mechanical lag of little more than a half cycle point. This lag provides the necessary clearance (see Fig. 3) to enable pawl 21 to snap into intercepting position prior to the arrival of the selected tooth at the stopping position.

The foregoing explains briefly the well-known type bar selecting mechanism. For the purposes of the present invention, type bar 19 has secured thereto a bracket 36 (Figs. 1 and 3) from which is suspended a spring blade 37 and contact slide 38. In the plane of slide 38 is an insulating panel 39 in which three multi-pronged plates 40, 41 and 42 are moulded and insulated from one another. The prongs all terminate in the common plane traversed by slide 38 and are spaced as shown in Fig. 4. The arrangement is such that with the type bar in any of its stopping positions, slide 38 will connect a prong of plate 40 with a wider prong of plate 41. With the type bar in positions intermediate such stopping positions, slide 38 will connect a prong of plate 42 with a wider prong of plate 41.

In effect, the slide and pronged plate arrangement constitutes a contact alternating device wherein, whenever a type bar is in a "stop" position, contacts 41, 40 are closed and, whenever the type bar is in an "intermediate" position, contacts 41, 42 are closed. These conditions are diagrammatically represented in Fig. 7 for each digital stopping condition. Thus, considering the type bar advancing to its 9 stopping position, contacts 40, 41 first close at a special asterisk stopping position (not herein concerned), then they open and contacts 41, 42 close midway between the asterisk and 9 positions, and finally at the 9 position contacts 40, 41 reclose. Since the bar is interrupted at 9, contacts 40, 41 remain closed throughout the remainder of the upstroke of the printing mechanism.

Similarly, for the other digits contacts 40, 41 and 41, 42 alternate in closure until the bar is interrupted for a particular digit when 40, 41 remain closed. During the return of the bars, the contacts reverse their operation, but they are ineffective during such period as no current is supplied thereto.

*The accumulator*

Referring to Figs. 1 and 5, there is a gear 44 on shaft 14 for each denominational order of the accumulator which drives a gear 45 on post 46, so as to make one revolution for each cycle of operation of the machine. The gear 45 drives a clutch element 47 having teeth facing a driven clutch element 48 (Fig. 6), which elements lie normally in parallel planes and held apart by the usual spring device. Located to one side of element 47 is a beveled disk 49 carried by bell crank 50 which is normally latched in the position of Fig. 5 by armature 51 of magnet 52.

Referring to Fig. 11, magnet 52 is energized concurrently with print magnet 22 through a parallel circuit from brush LB, connection 53, a switch 54 (closed for adding operations), and magnet 52 to line 29. Energization of magnet 52 will release bell crank 50 so that spring action will rock disk 49 against the driving element 47 to tilt it as shown in Fig. 6 into driving engagement with element 48, whereby the latter will be driven until a knock-out cam 55 disengages the clutch at a fixed point in the cycle.

In Fig. 7, lines 56 represent periods in a cycle during which the driven element 48 is rotated for each of the digits during adding operations. Following this, there is the usual tens carry advance (when required) represented by lines 56a.

Subtraction of an amount is carried out by initially tripping the accumulator clutch at a point corresponding to a 9 hole impulse and disengaging it under control of the hole in the card to in effect advance the wheel in accordance with the 9's complement of the digit subtracted.

As diagrammatically represented in Fig. 11, switches 57 and 58 are closed for a subtracting operation so that, when cam contacts C9 close (see Fig. 7), start magnet 52 is energized and the element 48 starts to turn as though for a 9 entry. As the brush LB now senses the card column, the print magnet circuit to magnet 22 is paralleled by a circuit from brush LB, connection 53, switch 57, and stop magnet 59 to line 29. In Fig. 5, magnet 59 attracts its armature 60, releasing a lever 61 which through a pin 62 will rock bell crank 50 back to its uncoupling position. In the case of a 9 hole, the magnets 52 and 59 are concurrently energized and prevent any coupling action, so that the element 48 remains at rest.

In Fig. 7, the rotative periods of element 48 for subtracting operation are indicated by lines 63. It is to be particularly noted that for adding the point at which the type bar is stopped for a given digit coincides substantially with the point at which element 48 starts rotating and that for subtraction the point at which the type bar is stopped for a given digit coincides substantially with the point at which the rotation of element 48 is stopped.

Element 48 has secured thereto the usual detent wheel 65 provided with teeth 66 between which a pawl 67 engages when the wheel is at rest to hold the wheel in position, and for each unit entry the wheel 65 is advanced one tooth.

For the purposes of the present invention, a lever 68 is pivoted above wheel 65 and provided with a roller 69, which when the wheel is at rest lies between a pair of adjacent teeth 66 as shown in Fig. 5. The lever has connection with a contact blade 70 to hold it against contact 72 in this position, being biased by a blade spring 73. With the wheel in motion, teeth 66 will rock lever 68 to lower contact 70 into engagement with a contact 71. This closure will occur, as is apparent, intermediate the successive stopping positions of the wheel.

In Fig. 7, the lines 70, 72 represent the contact condition with the accumulating wheel at rest or at a stopping position, while lines 70, 71 represent the condition with the wheel in motion between successive stopping positions.

As shown in Fig. 11, contacts 71 and 72 are wired to switches 74, 75 which are in full line position for adding and in dotted line position for subtracting. Contacts 70, 71, 72 and 40, 41, 42 are shown for two type bars and two accumulator wheels, with the contacts 41 of one set connected by wire 76 to contacts 70 of the next. The left hand contacts 70 are connected to line 27 through cam controlled contacts C49 which close repeatedly at points in the cycle, as shown in Fig. 7, coinciding with the points in the cycle at which the type bars and accumulating wheels should be in positions intermediate their stopping positions.

*Checking while adding*

From the foregoing and as is well known, during adding operations type bar stopping and accumulator wheel starting are coincidental. Through the checking contacts, a test is made under control of contacts C49 to ascertain whether such conditions obtains and is maintained throughout the entering period of the cycle.

Tracing of a particular example will best disclose the manner of checking, and it will be assumed that there is an 8 hole in the card columns. At the beginning of the cycle, the type bar begins to rise, first closing contacts 40, 41 (Fig. 7, line 8) and then 41, 42 (at the 9 point in the cycle). At this point, wheel contacts 70, 72 are still closed and, when contacts C49 close at 9, a circuit is traceable from line 27 (Fig. 11), contacts C49, contacts 70, 72, switch 75, wire 42a to the plate 42 which is connected through slide 38 to plate 41, wire 76, contacts 70, 72 and switch 75 of the next column, and (assuming like conditions for this column) the circuit continues through wire 78 to arm 79 of an emitter EM which contacts segments 80 at times indicated in Fig. 7. At present, the circuit extends through the 9 segment 80, wire 81, grid resistor 82 to the grid of the 9 thyratron 83, and branches through resistor 84 to negative side of a C source of current. Thyratron tube 83 is thus ignited and a circuit extends from line 27, through contacts C51, the 9 relay magnet 85, plate circuit of 9 tube 83 to line 29, opening the *a* contacts of 9 magnet 85 to hold them open until contacts C51 open near the end of the cycle (Fig. 7).

When the type bars reach the point between the 9 and 8 stopping positions, when contacts C49 again close a similar circuit is again completed through other prongs of plates 42, 41 and the 8 segment 80 of emitter EM to fire the 8 tube 83 and energize the 8 magnet 85, so that its contacts *a* also open.

Before the next closure of contacts C49, the 8 impulse from the card holes will have energized the print magnets 22 and start magnets 52 as explained. When contacts C49 close at the 7 cycle point, contacts 40, 41 will be bridged and contacts 70, 71 will be closed, thereby completing a circuit from line 27, contacts C49, contacts 70, 71, switch 74, wire 40a, plate 40, slide 38 and plate 41 (in the 8 type bar position), wire 76, then similarly through the next column, wire 78, arm 79, 7 segment 80 and 7 wire 81 to fire 7 tube 83 and energize 7 magnet 85 opening its *a* contacts.

For each of the subsequent closures of contacts C49, a like circuit will be repeated to in succession energize the 6, 5, 4, 3, 2, 1 and 0 magnets 85 (some of which are not shown in Fig. 11), so that they will have been opened during the testing period. The *a* contacts are wired in parallel to complete an initial circuit (when current is placed on lines 27, 29) from line 27, *a* contacts of magnets 85, relay magnet 87, and switch 88 to line 29. Thus, magnet 87 is deenergized when the last *a* contact of magnet 85 opens and later, when contacts C52 close (Fig. 7), they will be ineffective since the circuit therethrough will be open at the *b* contacts of magnet 87.

It may be mentioned at this point that failure of any magnet 85 to pick up during the testing period will leave its *a* contacts closed and magnet 87 energized at the time of closure of contacts C52 and, therefore, a circuit will become completed from line 27, contacts C52, *b* contacts of magnet 87, magnet 89, and signal lamp 90 to line 29. Magnet 89 will close its *c* contacts to provide a holding circuit through switch 91, so that the lamp 90 will remain lighted at the end of the cycle. In the over simplified circuit diagram, the test indication is illustrated as constituting a lamp, but it will be obvious that other current responsive devices may be utilized in an automatic machine, for example, to interrupt card feeding operations.

Let us assume now a condition wherein, due to some mechanical difficulty, such as binding of the type bar at the start, it is retarded so that in response to the sensing of an 8 hole in the card the stop pawl 21 catches the 9 tooth 31 in the bar and stops it in the 9 position, but that the 8 impulse from the card initiates the accumulator wheel rotation at the proper time. The condition of the various contacts for this assumed condition is represented in Fig. 8 from which it is seen that at the 9 test time contacts 70, 72 and 41, 42 are both closed, completing the circuit through the 9 segment 80 of the emitter to fire the 9 tube 83 and energize the 9 magnet 85.

However, at the 8 test time, the accumulator wheel is still at rest and the type bar is also stopped, so that contacts 70, 72 and 40, 41 are closed. The test circuit from line 27, contacts C49, 70, 72, switch 75, wire 42a will be open at the plate 42, since the slide 38 is now bridging plates 40, 41 and consequently the 8 magnet 85 will not be energized. Later, when contacts C52 close, the error signal lamp 90 will be lighted.

Figure 9:
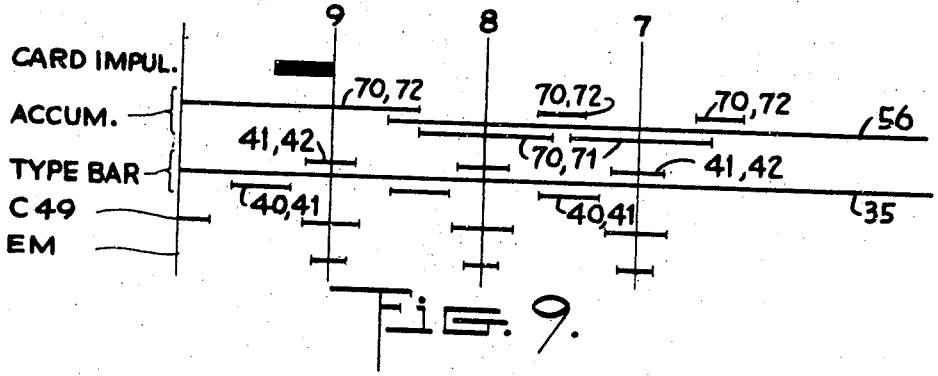

Let us assume as a further example that, in response to sensing a 9 hole, the accumulator wheel started rotating correctly, but due to some mechanical failure such as wear on the stop pawl or breaking of its spring, the type bar was not interrupted but continued to rise. This condition is illustrated in Fig. 9 where again at the 9 test time contacts 70, 72 as well as 41, 42 are closed to complete the circuit for energization of the 9 magnet 85. However, at the 8 and 7 times contacts 70, 71 are closed together with contacts 41, 42 thus effecting a circuit transposition, wherein no circuit is completed to the corresponding magnets 85 and as a result the error is indicated by lamp 90.

Inspection will show that for any other situation in which the type bar and wheel are both in motion or both at rest at a testing point in the cycle, an error will be indicated.

*Checking while subtracting*

For subtracting operations, switches 74, 75 (Fig. 11) are shifted to their dotted line positions to reverse the circuit connections, inasmuch as explained the type bar and wheel initially advance together and stop together. Since as seen from Fig. 7 the wheel does not start until after the 9 time in the cycle, the test at the 9 time is disabled and this is effected by the setting of switch 92 (Fig. 11) in its dotted line position, so that the contacts of the 9 magnet 85 become ineffective.

Figure 10:
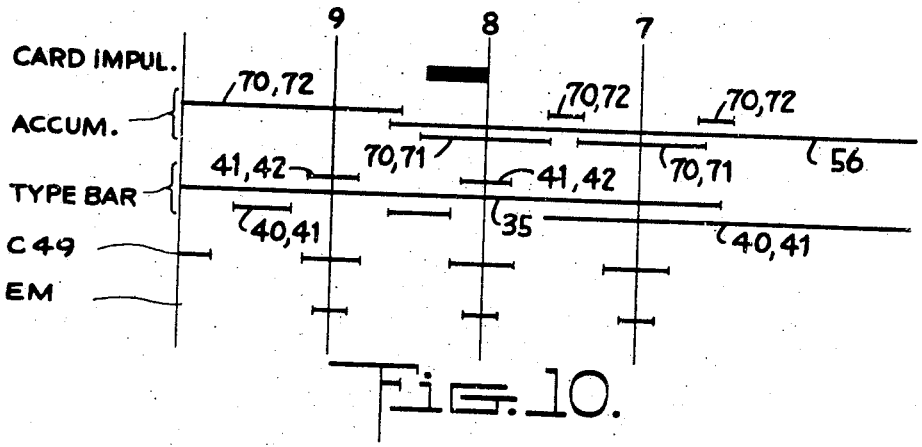

Fig. 10 illustrates a condition during subtraction, wherein in response to an 8 card impulse the type bar stopped correctly but the accumulator continued to turn. At the 9 test time, no test circuit is completed to the 9 magnet 85 (but its contacts are cut out of the parallel circuit, so this has no effect). At the 8 test time, a circuit is completed to the 8 magnet 85, since contacts 70, 71 and 41, 42 are both closed. The circuit is traceable from line 27, contacts C49, 70, 71, switch 74 (shifted), wire 42a to the plate 42, slide 38, plate 41 and wire 76 through the next column (if correctly synchronized) to the 8 tube 83. At the 7 test time, contacts 70, 71 are closed but 41, 42 are open and the circuit is thus incomplete, leaving the 7 magnet 85 deenergized, so its a contacts will keep magnet 87 energized and indicate an error.

By thus providing a repeated check between type bar and accumulating wheel positions, there is assurance that the digit printed represents the value of the digit entered into the accumulator and any failure of either device will be immediately detected, so that the cause thereof may be promptly remedied.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable accounting machine having a type bar, means for moving said bar from a rest position through a succession of stopping positions, means for stopping the bar at a selected position, an accumulator wheel, means for initiating and effecting rotation of the wheel from a rest position, means for interrupting said rotation at a fixed point in the cycle and control means for concurrently operating said type bar stopping means and said accumulating wheel rotation initiating means, in combination with a set of contacts adjusted by the type bar in one manner when the bar is at any of its stopping positions and in another manner when the bar is intermediate any successive stopping positions, a second set of contacts adjusted by said wheel in one manner when the wheel is at any of its stopping positions and in another manner when the wheel is intermediate any successive stopping positions, a circuit path including said sets of contacts, said contacts being interconnected to partially complete said path whenever the bar is at a stopping position and the wheel is concurrently at an intermediate position or whenever the bar is at an intermediate position and the wheel is at a stopping position, means for completing the circuit path at a predetermined point in the cycle and current responsive means included in the circuit and operable therethrough at said cycle point only if the path is partially completed at such point by the said contacts.

2. The invention set forth in claim 1, in which the means for completing the circuit is rendered repeatedly effective at each of a plurality of successive points in the cycle to energize the current responsive device at each point at which the path is partially completed by said contacts.

3. In a cyclically operable accounting machine having a type bar, means for moving said bar from a rest position through a succession of stopping positions, means for stopping the bar at a selected position, an accumulator wheel, means for initiating and effecting rotation of the wheel from a rest position, means for interrupting said rotation at a fixed point in the cycle and control means for concurrently operating said type bar stopping means and said accumulating wheel rotation initiating means, in combination with a device for testing the relative positions of the bar and wheel at a predetermined point in the cycle of operaton, an error indicator, and means controlled by said device for operating said error indicator if both the bar and wheel are in their stopped positions at said predetermined point in the cycle.

4. In a cyclically operable accounting machine having a type bar, means for moving said bar from a rest position through a succession of stopping positions, means for stopping the bar at a selected position, an accumulator wheel, means for initiating and effecting rotation of the wheel from a rest position, means for interrupting said rotation at a fixed point in the cycle and control means for concurrently operating said type bar stopping means and said accumulating wheel rotation initiating means in combination with a device for testing the relative positions of the bar and wheel at a predetermined point in the cycle of operation, an error indicator, and means controlled by said device for operating said error indicator if both the bar and wheel are in motion at said predetermined point in the cycle.

ORVILLE B. SHAFER.

REFERENCES CITED

The following references are of record in the file of this patent:

UNITED STATES PATENTS

| Number | Name | Date |
| --- | --- | --- |
| 2,199,547 | Pierce | May 7, 1940 |